United States Patent

Economy et al.

[15] 3,668,059

[45] June 6, 1972

[54] HIGH MODULUS BORON NITRIDE FIBERS

[72] Inventors: James Economy, Eggertsville; Ruey-Yuan Lin, Williamsville, both of N.Y.

[73] Assignee: The Carborundum Company, Niagara Falls, N.Y.

[22] Filed: Jan. 8, 1971

[21] Appl. No.: 105,129

[52] U.S. Cl. ................................ 161/170, 23/101, 23/191, 57/140, 161/169
[51] Int. Cl. ............... C01b 21/06, C01g 57/00, B32b 15/02
[58] Field of Search .................... 23/191, 157, 158; 161/170, 161/172; 57/140

[56] References Cited

UNITED STATES PATENTS

| 3,578,403 | 5/1971 | Moore | 23/191 |
|---|---|---|---|
| 3,476,641 | 11/1969 | Milewski | 161/170 |
| 3,429,722 | 2/1969 | Economy et al. | 23/191 X |
| 3,999,979 | 9/1968 | Hamling | 23/191 X |
| 3,351,690 | 11/1967 | Stover | 23/191 X |
| 3,241,919 | 3/1966 | O'Connor | 23/191 |
| 3,241,918 | 3/1966 | Lenihan et al. | 23/191 |
| 3,058,809 | 10/1962 | Taylor | 23/191 |
| 2,808,314 | 10/1957 | Taylor | 23/191 |

OTHER PUBLICATIONS

" The Vapor– Phase Deposition of Refractory Materials," I. E. Campbell et al., Electrochemical Society Journal, Vol. 96, July– Dec. 1949, pp. 318– 333

*Primary Examiner*—Robert F. Burnett
*Assistant Examiner*—Mark A. Litman
*Attorney*—David E. Dougherty and Peter P. Eichler

[57] ABSTRACT

Boric oxide fibers having a maximum diameter of about 10 microns are heated in an ammonia atmosphere under such conditions as to produce partially nitrided fibers consisting essentially of B, N, O and H wherein the N is present to the extent of from about 35 percent to about 55 percent. The partially nitrided fibers are then heated in an inert atmosphere at a temperature of at least about 1800°C while simultaneously subjecting the fibers to sufficient longitudinal tension as to at least prevent longitudinal shrinkage of the fibers and preferably to cause elongation of the fibers during heating. The resulting fibers, consisting essentially of boron nitride, are of high purity and are characterized by a relatively high Young's modulus of elasticity, which renders them especially suitable for reinforcing plastic, ceramic or metal matrices in the preparation of fiber reinforced composites.

6 Claims, No Drawings

HIGH MODULUS BORON NITRIDE FIBERS

BACKGROUND OF THE INVENTION

The present invention relates to fibers consisting essentially of boron nitride (BN) and to a method of producing such fibers. More particularly, the invention relates to BN fibers of high purity which are characterized by a relatively high Young's modulus of elasticity, and to a process for their production.

BN possesses a number of highly desirable properties which render it useful in a wide variety of applications. Its high electrical resistivity coupled with its high thermal conductivity make it especially useful in electrical and electronic applications requiring a material which simultaneously acts as an electrical insulator and a thermal conductor. Its excellent thermal shock resistance renders it effective as a refractory at temperatures up to 1600°C. or higher in a non-oxidizing atmosphere, and at temperatures as high as 700°–900°C in air. It is highly corrosion resistant, being inert to most organic liquids and many corrosive chemicals and displaying excellent resistance to attack by various molten metals.

In U.S. Pat. No. 3,429,722, assigned to the same assignee as the present application, James Economy et al have recently disclosed BN fibers and a method of making them which comprises heating boric oxide fibers in an ammonia atmosphere under specified conditions. Among the many uses for such BN fibers, one of the most potentially promising is the preparation of BN fiber reinforced composites. Such composites may be prepared by conventional methods, and they comprise a plastic, ceramic or metal matrix having BN fibers embedded therein in a suitable proportion to provide reinforcement, i.e., to render the Young's modulus of elasticity of the composite higher than that of the matrix material alone.

In recent years, there has been a rapidly increasing interest in the development of composites reinforced with various types of inorganic fibers, with a view toward fabricating strong, lightweight composites for use as structural materials, primarily in components of aircraft and aerospace vehicles. One important requirement of fibers for use in making reinforced composites is that they possess a relatively high Young's modulus of elasticity, in order to impart this property to the composite. Some progress has been made by using high modulus fibers of such materials as graphite and boron for the fabrication of composites. However, fibers of such materials present several problems, including poor oxidation resistance, incompatability with various metal matrices, and high cost.

BN fibers, on the other hand, are quite resistant to oxidation and display excellent resistance to many molten metals. A major obstacle to their extensive use for the fabrication of reinforced composites heretofore has been the lack of availability of BN fibers having a Young's modulus of elasticity high enough to provide a high degree of reinforcement. Moreover, the cost of BN fibers of sufficiently high purity to meet the requirements of corrosion resistance and oxidation resistance has heretofore been relatively high.

SUMMARY OF THE INVENTION

In accordance with the present invention, there is provided a novel and economical process for the production of high purity BN fibers which are characterized by a relatively high Young's modulus of elasticity as compared to presently available BN fibers, and which are accordingly of superior quality for the fabrication of reinforced composites.

The process of the invention comprises two basic steps. First, a fiber consisting essentially of boric oxide and having a maximum diameter of about 10 microns is heated in an ammonia atmosphere. The heating is started at a relatively low temperature and the temperature is increased at a suitable rate to a suitable final temperature at which temperature the fibers may be held for a suitable time if necessary. The heating is carried out under such conditions of rate of temperature rise, final temperature, and duration of holding at the final temperature as to produce, by virtue of a complex reaction or series of reactions that occurs between the boric oxide and ammonia, a partially nitrided boric oxide fiber which consists essentially of boron (B), nitrogen (N), oxygen (O) and hydrogen (H). More particularly, it has been found that the critical feature of such a partially nitrided fiber which is indispensable to its utility in accordance with this invention is that it contain from about 35 percent to about 55 percent, and preferably from about 40 percent to about 50 percent, nitrogen. Accordingly, the combination of temperature conditions selected for heating the boric oxide fiber in the ammonia atmosphere is such as to produce a partially nitrided fiber containing N in an amount within the ranges stated.

It has also been found that when such a partially nitrided fiber is heated in an inert atmosphere at a sufficiently high temperature, e.g., 1800°C, a further complex reaction or series of reactions occurs very rapidly within the fiber, accompanied by the dissipation of volatile substances, and the partially nitrided fiber is converted to a fiber consisting essentially of BN. However, it is observed that considerable longitudinal shrinkage or shortening of the fiber occurs during this high temperature reaction, as much as about 20 percent shrinkage being common, presumably due to the loss of some of the fiber constituents due to volatilization. A slight decrease in the diameter of the fiber may also occasionally occur. But more particularly, it is observed that such BN fibers generally have a relatively low Young's modulus of elasticity in the range from about $4 \times 10^6$ psi. ($0.3 \times 10^6$ kg./sq. cm.) to about $6 \times 10^6$ psi. ($0.4 \times 10^6$ kg./sq. cm.), the common range for commercially available BN fibers.

However, in accordance with the process of the present invention, and more particularly the second basic step thereof, it has been found that a fiber consisting essentially of BN but having a relatively high Young's modulus of elasticity may be produced by heating a partially nitrided boric oxide fiber consisting essentially of B, O, H and from about 35 percent to about 55 percent, preferably from about 40 percent to about 50 percent, nitrogen, in an inert atmosphere at a temperature of at least about 1,800°C and preferably at least about 2000°C, while subjecting the fiber to sufficient longitudinal tension as to at least prevent the longitudinal shrinkage which would otherwise occur, and preferably sufficient tension as to effect elongation of the fiber. As a result of the tension, the loss of volatile materials from the fiber during this heating is reflected in a decreased diameter of the fiber, rather than decreased length. More importantly, however, the Young's modulus of elasticity of the resulting BN fiber, as measured parallel to the longitudinal axis of the fiber is significantly greater than that of a fiber produced in the same manner but without longitudinal tension during the heating. Some increase in modulus is observed upon merely employing enough tension as to prevent longitudinal shrinkage. A greater increase is observed when the tension is sufficient to cause elongation, and in general, the greater the elongation, the higher the modulus. The resulting fiber, which is polycrystalline, consists essentially of BN and is characterized by a relatively high Young's modulus of elasticity which is generally greater than $6 \times 10^6$ psi. ($0.4 \times 10^6$ kg./sq. cm.), preferably at least about $15 \times 10^6$ psi. ($1.1 \times 10^6$ kg./sq. cm.) or higher and which may be as high as about $75 \times 10^6$ psi. ($5.2 \times 10^6$ kg./sq. cm.)

The invention will be described further with reference to the following examples, which are intended to illustrate and not to limit the invention, and the subsequent detailed discussion of preferred embodiments.

DESCRIPTION OF PREFERRED EMBODIMENTS

EXAMPLE 1

Preparation of Partially Nitrided Fibers

Molten boric oxide is melt spun in a conventional manner through an 800-tip bushing to produce a continuous multifilament yarn consisting of 800 filaments of boric oxide, the filaments being 7.5 microns in diameter.

Approximately 10 g. of the yarn is partially nitrided in the following manner, employing a vertical tube furnace comprising a vertical heat resistant glass tube externally equipped with electrical resistance heating wire. The yarn is suspended loosely in the glass tube, and ammonia gas is introduced into the bottom of the tube at a rate of 14.5 l./min., the upper end of the tube being vented to the atmosphere. While maintaining the ammonia current through the tube, the yarn is heated at 210°C over a period of 0.5 hour, then from 210°C to 550°C at a rate of 3.8°C per hour, and then from 550°C to 710°C at a rate of 3.5°C per hour. The temperature is held at 710°C for 1 hour and the furnace and its contents are permitted to cool to room temperature (about 25°C), at which point the ammonia flow is discontinued.

The resulting product is an 800-strand continuous multifilament yarn consisting of partially nitrided filaments having a diameter of 7.5 microns and a density of 1.6 g./cc. Elemental analysis indicates that the product contains 35.5% B and 46.9% N, the balance being oxygen primarily, and a small amount of hydrogen.

EXAMPLE 2

PREPARATION OF PARTIALLY NITRIDED FIBERS

Example 1 is repeated but with a different nitriding temperature cycle, according to which the boric oxide yarn is heated to 210°C over a period of 0.5 hour, then from 210°C to 550°C at a rate of 4°C per hour, then from 550°C to 640°C at a rate of 15°C per hour, the temperature then being held at 640°C for 1 hour. The product is then permitted to cool to room temperature. Elemental analysis indicates that the product contains 37% B and 40% N, the balance being oxygen primarily, and a small amount of hydrogen.

EXAMPLE 3

CONVERSION OF PARTIALLY NITRIDED FIBERS TO BN FIBERS WITHOUT TENSION (CONTROL)

Partially nitrided multifilament yarn prepared as in Example 1 is converted to boron nitride multifilament yarn in the following manner. The apparatus employed for the conversion comprises a graphite susceptor tube horizontally disposed within the coil of a high frequency electrical induction furnace, the tube and coil being enclosed in an outer glass chamber having suitable ports to permit the passage therethrough of the yarn being treated and to facilitate control of the furnace atmosphere. The susceptor tube is 15 cm. long and has a hot zone about 2.5 cm. long. A variable speed motor-driven take-up spool is used to continuously pull the yarn through the susceptor tube and outer chamber from a freely turning supply spool on which the yarn to be converted is wound, the two spools being mounted outside the opposite ends of the chamber in such positions that the yarn being drawn through the susceptor tube is coaxial with the longitudinal axis of the tube.

The chamber is purged with nitrogen and a continuous slow current of nitrogen is passed through the chamber to maintain an inert, non-oxidizing atmosphere. The take-up spool motor is turned on, being set to draw the partially nitrided yarn through the furnace at a rate of 20 cm./min., the residence time of the yarn in the 2.5 cm. hot zone thus being about 8 seconds. The furnace is turned on and heated rapidly to 2000°C as measured by an optical pyrometer sighted in the hot zone, the temperature then being held at 2000°C while the yarn is being drawn through. By measuring the input rate of the yarn from the supply spool and comparing that rate with the relatively slower take-up rate, it is computed that the yarn undergoes a longitudinal shrinkage of about 20% as it passes through the hot zone.

The resulting multifilament yarn is composed of filaments having an average diameter of about 7.5 microns and consisting essentially of BN. Anal.: B, 42.85%; N, 56.49%; total B + N, 99.34%. Measurements on a plurality of filaments selected at random from the yarn show an average Young's modulus of elasticity of $5.1 \times 10^6$ psi ($0.36 \times 10^6$ kg./sq. cm.).

EXAMPLE 4

CONVERSION TO BN FIBERS WITH TENSION TO PREVENT SHRINKAGE

Partially nitrided multifilament yarn similar to that prepared in Example 1, but having a filament diameter of 6 microns and containing 42% nitrogen, is converted to BN multifilament yarn as in Example 3, but at a temperature of 2100°C. Also, torque is applied to the supply spool to restrict free rotation thereof and to apply just sufficient longitudinal tension to the filaments as to prevent longitudinal shrinkage during the heating, the tension on the filaments being approximately 100 pounds per square inch (7 kg./sq. cm.) of cross-sectional area.

The resulting multifilament yarn is composed of filaments having an average diameter of 5.2 microns and consisting essentially of BN. Anal.: B, 43.29 percent; N, 56.16 percent; total B + N, 99.90 percent. Average Young's modulus of elasticity, $6.8 \times 10^6$ psi. ($0.48 \times 10^6$ kg./sq. cm.).

EXAMPLE 5

CONVERSION TO BN FIBERS WITH TENSION TO EFFECT ELONGATION

Partially nitrided yarn similar to that prepared in Example 1, but having a filament diameter of 6 microns and containing 42% nitrogen, is converted to BN yarn as in Example 3, but at a temperature of 1,800°C. Also, torque is applied to the supply spool to apply sufficient longitudinal tension to the filaments as to cause about 10 percent elongation thereof during the heating, the tension on the filaments being approximately 800 pounds per square inch (56 kg./sq. cm.) of cross-sectional area. The extent of elongation is readily computed from a comparison of the take-up rate with the relatively slower supply rate.

The resulting yarn is composed of filaments having an average diameter of about 4.5 microns and consisting essentially of BN. Anal.: B, 42.01 percent; N, 56.54 percent; total B + N, 98.55 percent. Average Young's modulus of elasticity, $15.2 \times 10^6$ psi. ($1.01 \times 10^6$ kg./sq. cm.).

EXAMPLE 6

CONVERSION TO BN FIBERS WITH TENSION TO EFFECT ELONGATION

The partially nitrided yarn prepared in Example 1 is converted to BN continuous multifilament yarn as in Example 3, at a temperature of 200°C, but torque is applied to the supply spool to apply a longitudinal tension on the filaments of about 800–1000 pounds per square inch (56–70 kg./sq. cm.) of cross-sectional area. From the established take-up rate of 1 ft./90 sec. (20 cm./min.) and the measured supply rate of 1 ft./110 sec. (16 cm./min.), it is computed that the filaments elongate by about 22 percent during the heating.

The resulting yarn is composed of filaments having an average diameter of 5.7 microns and consisting essentially of BN. Anal.: B, 43 percent; N, 56 percent; total B + N 99 percent. Average Young's modulus of elasticity, $29.3 \times 10^6$ psi. ($2.05 \times 10^6$ kg./sq. cm.); average tensile strength, $81.5 \times 10^3$ psi. ($5.7 \times 10^3$ kg./sq. cm.); average density 2.1 g./cc.

Since the Young's modulus of elasticity and the tensile strength of the BN fibers increase with decreasing diameter of the fibers, these properties were measured on the finest filaments found in the product (5.0 microns diameter), the Young's modulus being $34.2 \times 10^6$ psi. ($2.4 \times 10^6$ kg./sq. cm.), and the tensile strength being $84 \times 10^3$ psi. ($5.9 \times 10^6$ kg./sq. cm.). By employing partially nitrided fibers of somewhat smaller diameter than those employed in the present example, BN fibers having a Young's modulus of about $40 \times 10^6$ psi.

(2.8 × 10⁶ kg./sq. cm.) may readily be produced. The same result may be accomplished by employing greater tension to increase the extent of elongation of the fibers during conversion. Under optimum conditions of diameter and composition of the partially nitrided fibers, temperature, amount of tension and the like, BN fibers may be produced in accordance with the invention having a Young's modulus as high as about 75 × 10⁶ psi. (5.2 kg./sq. cm.).

EXAMPLE 7

CONVERSION TO BN FIBERS WITH TENSION TO EFFECT ELONGATION

Partially nitrided yarn such as that prepared in Example 1, but having a filament diameter of 6 microns and containing 42% nitrogen, is converted to BN yarn as in Example 3, but at a temperature of 2350°C. Also, torque is applied to the supply spool to apply sufficient tension to the filaments as to cause about 7 percent elongation thereof during the heating, the tension on the filaments being approximately 600 pounds per square inch (42 kg./sq. cm.) of cross-sectional area.

The resulting yarn is composed of filaments having an average diameter of about 5.1 microns and consisting essentially of BN. Anal.: B, 43.41 percent; N, 55.03 percent, total B + N, 98.44 percent. Average Young's modulus of elasticity, 11.9 × 10⁶ psi. (0.83 × 10⁶ kg./sq. cm.).

Although the process of the invention may be carried out while employing but a single fiber of any desired length, and the invention has been so described in part herein, this is generally uneconomical, and it is to be understood that the process may be, and usually is preferably, carried out while employing a plurality of fibers, as in the examples. For example, the process may be carried out using a yarn or textile roving formed of staple fibers of various lengths, and although some slippage may occur between the individual fibers when longitudinal tension is applied, it is possible to effect sufficient tension on most of the individual fibers as to prevent shrinkage and/or cause elongation. Preferably, a continuous multifilament yarn is employed as in the examples to facilitate more uniform elongation or stretching of the individual filaments.

It will also be understood that, while furnaces such as those employed in the examples are convenient for carrying out the process steps according to the invention, other types of furnaces familiar to those skilled in the art and capable of generating the requisite temperature and containing the required atmosphere may be used, including vertical or horizontal tube or induction furnaces.

Now considering the various aspects of the invention in detail, boric oxide fibers suitable for the practice of the invention may readily be prepared by conventional techniques such as those employed in producing glass fibers. Thus, for example, continuous boric oxide fibers may be spun from a boric oxide melt, being wound upon a revolving spool. Alternatively, boric oxide fibers may be blown in staple form by the conventional technique of causing a jet of any suitable gas to impinge upon a thin falling stream of molten boric oxide. Fibers having a diameter of a few microns or less, as well as coarser fibers, may easily be produced by melt spinning, and fibers having diameters in the submicron range, as well as coarser fibers, may be obtained by blowing. If the boric oxide melt contains a small amount of silica, the fibers will likewise contain a small amount of silica, which is not ojectionable, since the silica remains unaffected by the process of the invention and the resulting fibers consist essentially of BN but also contain a small amount of silica.

For the purposes of the invention, there appears to be no critical minimum diameter of the boric oxide fibers which may be employed, but they should have a diameter no greater than about 10 microns. When fibers of greater diameter are employed, the ammonia may have difficulty penetrating to the core of the fibers, and the resulting partially nitrided fibers are likely to be non-uniform in composition throughout their cross section.

Partially nitrided fibers containing less than about 35% N have been found to be too weak to withstand the necessary tension during the high temperature conversion, tending to break rather than elongate or retain their original length. It has been found to be impossible to achieve an increased modulus by high temperature conversion of partially nitrided fibers containing more than about 55% N. Fibers having a nitrogen content of from about 40 percent to about 50 percent are preferred, permitting a maximum increase in modulus and having greater strength than fibers containing less N. Less increase in modulus is observed when fibers containing from about 50 percent to about 55 percent N are employed.

The precise composition of the partially nitrided fibers is extremely complex, and no attempt need be made here to describe it in detail, since it is the nitrogen content that is critical. In addition to nitrogen in the stated amount, the fibers consist essentially of B, O and H. Analyses to determine the precise amounts of O and H present in a given sample have proven difficult and unreliable.

The partial nitriding step may be carried out under a wide range of conditions to produce fibers having the required nitrogen content. Reference is made to the extensive discussion in the Economy et al patent referred to above, and to Examples 1 and 2 herein. The nitrogen content of the fibers is governed by three parameters, viz the rate of temperature rise, the final temperature and the duration of holding at the final temperature. In general, the faster the rate of temperature rise, the lower the N content; and the higher the final temperature and the longer the duration of holding at the final temperature, the higher the N content. Thus the partially nitrided fibers of Example 2 have a lower N content than those of Example 1 due to a faster rate of temperature increase and a lower final temperature. If in Example 1 the holding time at 710°C is increased from 1 hour to 4 hours, fibers containing more than 55% N are produced, and the same result is obtained, if, alternatively, the rate of temperature rise from 210°C to 710°C is decreased to 2°C per hour. Conversely, if in Example 1 the final temperature is reduced from 710°C to 620°C and the fibers are not held at the final temperature, fibers containing less than 35% N are produced, and the same result is obtained, if alternatively, the rate of temperature rise from 210°C to 710°C is increased to 10°C per hour.

The heating is carried out in an ammonia atmosphere. In some types of furnaces having a large capacity, and especially when only a small quantity of fibers is to be treated, the atmosphere may be established at the outset of the heating cycle and remain static. In other types of furnaces, such as tube furnaces, especially when a substantial quantity of fibers is to be treated, it may be necessary to maintain the ammonia atmosphere as a current through the furnace, at a flow rate which is sufficient to remove the gaseous by-products produced during the reaction and to provide a constant fresh supply of ammonia for the reaction. In such a case, it may be desirable to preheat the ammonia to a suitable temperature before introducing it into the furnace, to avoid decreasing the temperature within the furnace.

Partially nitrided fibers containing the specified amount of N may be converted to fibers consisting essentially of BN and having a relatively high modulus of elasticity by heating them at at least about 1,800°C in an inert atmosphere while subjecting them to longitudinal tension. The conversion to BN takes place almost instantaneously, and is preferably carried out in a continuous fashion as in the examples, although batchwise conversion is possible.

A temperature of at least about 1,800°C is required for the conversion, since at lower temperatures the conversion may be incomplete and the resulting fibers may be relatively impure. For example, if Example 6 is carried out at a temperature of 1,700°C instead of 2,000°C, the resulting fibers are found to contain 41.82% B and 52.26% N, a total of only 94.08% B + N, the balance being primarily oxygen. A temperature of at least about 2,000°C is preferred, to insure substantially complete conversion, and because temperatures of about 2,000°C and higher tend to render the fibers more susceptible to elongation under tension. Considerably higher temperatures may be employed (e.g., 2,350°C in Example 7), within the capability of the apparatus used and with regard to the fact that BN sublimes at about 3,000°C.

In order to achieve a significant improvement in modulus of elasticity, at least sufficient longitudinal tension must be employed as to prevent longitudinal shrinkage of the fibers. Preferably, sufficient tension is applied as to cause elongation of the fibers. Ideally, the amount of tension is such as to effect maximum elongation, the extent of elongation generally increasing with increasing tension and the modulus of the fibers generally increasing with increasing elongation.

Any suitable inert atmosphere may be employed, such as nitrogen, argon, helium, neon and the like. A vacuum may be employed, but is less convenient. Atmospheres containing appreciable amounts of oxygen, or substances such as water which will decompose to form oxygen at the temperatures employed, are not suitable since the product is subject to oxidation at these temperatures. When converting substantial amounts of fibers, it is generally desirable to maintain a current of the inert gas through the furnace to remove the by-products of the conversion.

No definitive theory can be advanced as to the precise chemical and/or physical mechanisms responsible for the high moduli attainable in BN fibers according to the invention. Attempts have been made to achieve higher moduli by applying tension to fibers during the partial nitriding step, but without success. Similarly, it has proven impossible to increase the modulus of BN fibers by heating them under tension.

In any event, BN fibers produced according to the invention are characterized by a relatively high Young's modulus of elasticity, as measured parallel to the longitudinal axis of the fiber. For use in reinforced composites, a modulus of at least about $15 \times 10^6$ psi. ($1.1 \times 10^6$ kg./sq. cm.) is preferred. The fibers are polycrystalline, have a density closely approaching the theoretical density of BN (2.25 g./cc.), and consist essentially of BN, being of high purity as is evidenced by the fact that they almost invariably have a combined B and N content above 98 percent, and often above 99 percent. Such high purity is reflected in superior resistance to oxidation and corrosion. The diameter of the fibers is necessarily less than about 10 microns, since they are derived from boric oxide fibers and partially nitrided fibers having a maximum diameter of about 10 microns and since a decrease in diameter occurs during conversion of the partially nitrided fibers to BN fibers under tension.

Values of Young's modulus of elasticity and tensile strength set forth herein were determined in accordance with A.S.T.M. D2101–64T. Percents referred to herein are percents by weight, except as otherwise stated or indicated by the context such as in respect to percent shrinkage or elongation.

While the invention has been described herein with reference to certain preferred embodiments, it is to be understood that various changes and modifications may be made by those skilled in the art without departing from the concept of the invention, the scope of which is to be determined by reference to the following claims.

We claim:

1. A polycrystalline fiber having a diameter less than about 10 microns consisting essentially of boron nitride, said fiber having a Young's modulus of elasticity of at least about $15 \times 10^6$ psi and said fiber being produced by heating a partially nitrided boric oxide fiber under longitudinal tension.

2. A yarn consisting of a plurality of fibers as set forth in claim 1.

3. A yarn as set forth in claim 2 which consists essentially of continuous filaments.

4. A yarn as set forth in claim 2 which consists essentially of staple fibers.

5. A reinforced composite comprising a matrix of a material selected from the group consisting of plastics, ceramics and metals, said matrix having embedded therein a sufficient amount of fibers as set forth in claim 1 to effect reinforcement.

6. A polycrystalline fiber as set forth in claim 1 having a maximum Young's modulus of elasticity of about $75 \times 10^6$ psi.

* * * * *